United States Patent
Girdhar (10) Patent No.: US 10,540,637 B2
(45) Date of Patent: Jan. 21, 2020

(54) INTELLIGENT, CONTEXT-BASED DELIVERY OF SENSITIVE EMAIL CONTENT TO MOBILE DEVICES

(71) Applicant: CA, INC., New York, NY (US)

(72) Inventor: Dhiraj Girdhar, Westborough, MA (US)

(73) Assignee: CA, Inc., New York, NY (US)

( * ) Notice: Subject to any disclaimer, the term of this patent is extended or adjusted under 35 U.S.C. 154(b) by 115 days.

(21) Appl. No.: 15/649,905

(22) Filed: Jul. 14, 2017

(65) Prior Publication Data

US 2019/0019154 A1 Jan. 17, 2019

(51) Int. Cl.
*G06Q 10/10* (2012.01)
*H04W 12/06* (2009.01)
*H04L 12/58* (2006.01)

(52) U.S. Cl.
CPC ......... *G06Q 10/107* (2013.01); *H04L 51/043* (2013.01); *H04L 51/063* (2013.01); *H04W 12/06* (2013.01)

(58) Field of Classification Search
CPC ... G06Q 10/107; H04L 51/043; H04L 51/063; H04W 12/06
See application file for complete search history.

(56) References Cited

U.S. PATENT DOCUMENTS

| | | | |
|---|---|---|---|
| 8,166,299 B2 | 4/2012 | Kemshall | |
| 8,935,768 B1* | 1/2015 | Tyree | G06F 21/6227 706/12 |
| 9,021,448 B1* | 4/2015 | Gagliardi | G06F 8/70 717/128 |
| 9,177,174 B1 | 11/2015 | Shoemaker et al. | |
| 10,129,197 B2* | 11/2018 | Liberty | H04L 51/22 |

OTHER PUBLICATIONS

Kucherawy, RFC 7372 "Email Authenitcation Status Codes", Sep. 2014, 8 pages.*

* cited by examiner

*Primary Examiner* — Todd L Barker
(74) *Attorney, Agent, or Firm* — Baker Botts L.L.P.

(57) ABSTRACT

According to an embodiment of the present disclosure, a method by an electronic message server includes determining that an electronic message for delivery to a first user comprises sensitive content. Prior to transmitting the electronic message to a client device associated with the first user, the electronic message server requests at least one device attribute from the client device associated with the first user. The at least one device attribute is received from the client device associated with the user. Based on the at least one device attribute, the electronic message server masks the sensitive content such that the masked sensitive content is unreadable within the electronic message. The electronic message that includes the masked content that is unreadable within the electronic message is transmitted to the client device associated with the first user.

18 Claims, 5 Drawing Sheets

INTELLIGENT, CONTEXT-BASED DELIVERY OF SENSITIVE EMAIL CONTENT TO MOBILE DEVICES

BACKGROUND

The present disclosure relates to content delivery and, in particular, to a method, apparatus, and executable instructions for intelligent, context-based delivery of sensitive email content to mobile devices.

SUMMARY

According to an embodiment of the present disclosure, a method by an electronic message server includes determining that an electronic message for delivery to a first user comprises sensitive content. Prior to transmitting the electronic message to a client device associated with the first user, the electronic message server requests at least one device attribute from the client device associated with the first user. The at least one device attribute is received from the client device associated with the user. Based on the at least one device attribute, the electronic message server masks the sensitive content such that the masked sensitive content is unreadable within the electronic message. The electronic message that includes the masked content that is unreadable within the electronic message is transmitted to the client device associated with the first user.

According to another embodiment of the present disclosure, a method by client device includes receiving a request from an electronic message server for at least one device attribute. The at least one device attribute is transmitted to the electronic message server. An electronic message is received and displayed on a user-interface of the client device. The electronic message includes unmasked content that is readable within the electronic message and masked content that is unreadable within the electronic message.

According to another embodiment of the present disclosure, an electronic message server includes a memory storing instructions and processing circuitry configured to execute the instructions to cause the processing circuitry to determine that an electronic message for delivery to a first user comprises sensitive content. Prior to transmitting the electronic message to a client device associated with the first user, the processing circuitry requests at least one device attribute from the client device associated with the first user. The at least one device attribute is received from the client device associated with the user. Based on the at least one device attribute, the sensitive content is masked within the electronic message such that the sensitive content is unreadable within the electronic message. The electronic message that includes the masked sensitive content that is unreadable within the electronic message is transmitted to the client device associated with the first user.

Other objects, features, and advantages will be apparent to persons of ordinary skill in the art in view of the following detailed description and the accompanying drawings.

BRIEF DESCRIPTION OF THE DRAWINGS

For a more complete understanding of the present disclosure, needs satisfied thereby, and the objects, features, and advantages thereof, reference now is made to the following description taken in connection with the accompanying drawings. Embodiments of the present disclosure, and their features and advantages, may be understood by referring to FIGS. 1-6, like numerals being used for corresponding parts in the various drawings.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor and/or processing circuitry of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Enterprise employees commonly use mobile phones and other wireless devices to receive and read enterprise emails. Some employees may receive enterprise-issued wireless devices for this purpose. However, enterprise employees may also use their personal phones tablets, and computers to read enterprise emails as well. Enterprise systems may use Mobile Device Management and Mobile Content Management tools to provide the ability for an enterprise employee to securely access enterprise emails on such devices. However, because all such mobile devices are susceptible to being stolen, misplaced, or compromised, enterprises may deploy a set of security tools that provide a security layer around mobile applications used to send and receive emails.

In an example scenario, an enterprise employee may send an electronic message to a group of recipients which may or may not include other enterprise employees. Where the electronic message comprises an email, email servers on both the sender side and the recipient side play an important role in the exchange of the electronic message across identified email addresses in this process. However, an enterprise may desire to apply some restriction policies on accessing the electronic message, especially where the electronic message includes sensitive content. For example, these limitations may include geo fence limitations which prevent mobile devices outside a geo fence area from accessing electronic messages. As another example, the enterprise may restrict access to enterprise emails when the mobile devices are using unknown or public networks. As another example, an enterprise may restrict access to enterprise emails on mobile devices that are unknown to the network or on rooted devices.

While the collaboration and information exchange among enterprise employees and partners play a key role for any enterprise, securing sensitive information is a very important aspect. Enterprises are adopting layers of security around email systems as a measure to avoid unintended information leaks. Encrypting email is one such technique. For example, either the author of the email or the electronic message server used to send the email may flag an email as sensitive. The email may then be encrypted before the email is delivered to the intended recipients. The recipients can read such emails after some kind of authorization or authentication process. Thus, the sending party expects and assumes that the recipients will be authorized or authenticated so that they are able to decrypt and view the content.

Such encryption techniques may provide adequate protection for a simple sensitive email flow. However, requiring recipients to be authenticated before such electronic messages can be read is inconvenient and time-consuming. Additionally, the electronic message may be delivered outside the enterprise email system via partners, public email servers, and other uncontrolled systems. Additionally or alternatively, the electronic message may be delivered to unknown, unsecure or stolen devices. The electronic message may be delivered using unsecure or unknown network and may be delivered to restricted regions.

The original author of an electronic message may not know or have control over how the information is being distributed. Currently, there is not a mechanism for the intelligent, context-based deliver of electronic messages that provides both user convenience and security. Thus, there is a need in the market place for a mechanism that securely delivers electronic messages having sensitive content to an intended recipient.

Figure 1:
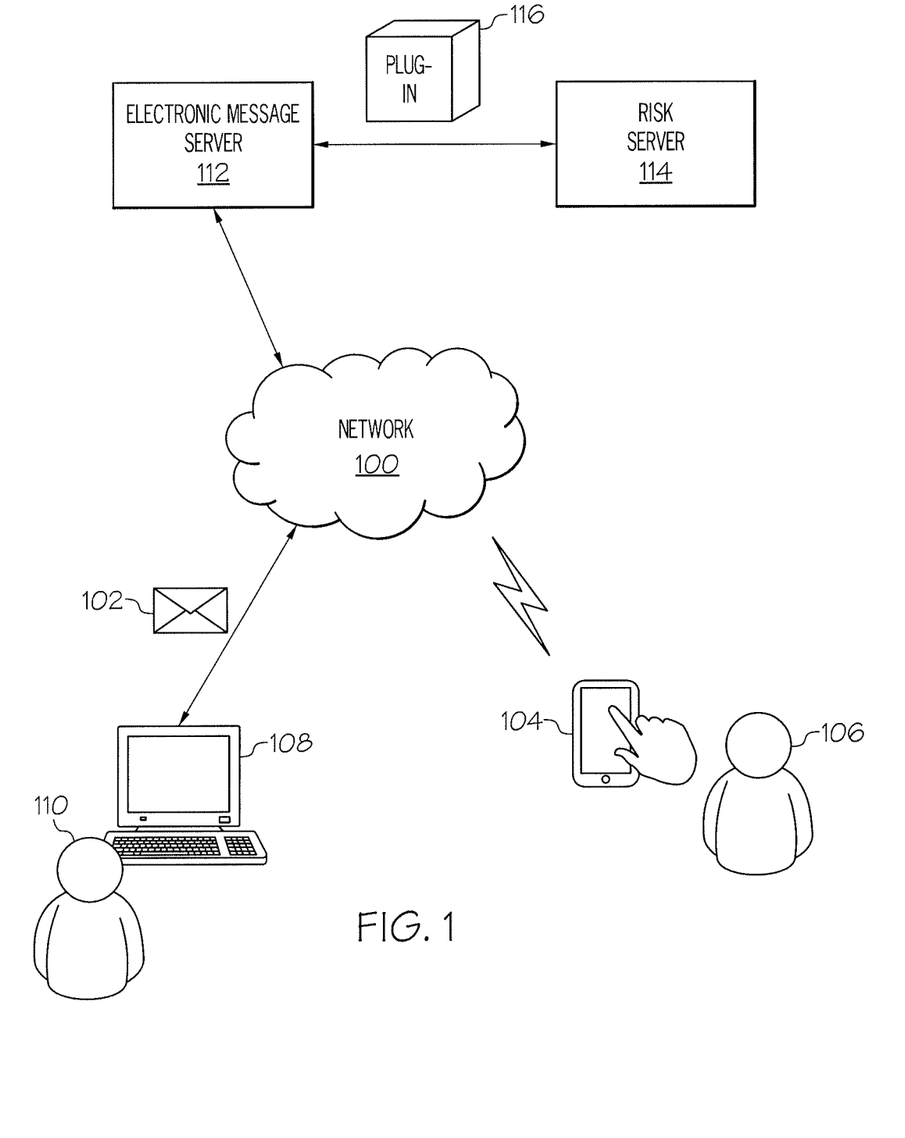
FIG. 1 illustrates an environment for intelligent, context-based delivery of sensitive email content to mobile devices according to a non-limiting embodiment of the present disclosure.

FIG. 1 illustrates an exemplary distributed system in which the subject matter of the disclosure can function. The system generally includes a network 100 for the communication of an electronic message 102 that includes sensitive content to a first client device 104 associated with a first user 106. According to certain embodiments, the electronic message 102 may initiate from a second client device 108 associated with a second user 110. Thus, in such an example, first user 106 may be considered the recipient of electronic message 102, while second user 110 may be considered the sender of electronic message 102.

According to certain embodiments, electronic message 102 may be transmitted from second computing device 108 to an electronic message server 112 via network 100. In certain embodiments, electronic message server 112 may autonomously or in cooperation with risk server 114 determine that electronic message 102 includes sensitive content. In response to such a determination, electronic message server 108 and/or risk server 114 may operate to determine if one or more security policies require the sensitive content to be hidden, masked, or otherwise protected. In a particular embodiment, electronic message server 112 may include an enterprise email server that is associated with an enterprise that employees one or both of first user 106 and second user 110.

According to certain embodiments, the one or more security policies may require electronic message server 112 and/or risk server 114 to obtain and analyze context information associated the receiving device. For example, in a particular embodiment, one or more device attributes may be requested and obtained from first client device 104. Thus, electronic message server 112 and/or risk server 114 may monitor the operational environment of first client device 104. Where environmental factors such as the current operational environment of first client device 104 are determined to present a risk over a threshold amount, the sensitive content within electronic message 102 may be delivered to first client device 104 in a masked, hidden, blurred, encrypted, or other undecipherable format. However, because first user 106 is able to read other portions of electronic message 102 that are not considered sensitive, first user 106 may be able to understand the general email context. According to certain embodiments, first user 106 may be required to be authenticated or re-authenticated by electronic message server 112 before being allowed to view the sensitive content within electronic message 102.

Network 100 generally refers to any interconnecting system capable of transmitting audio, video, signals, data, messages, or any combination of the preceding. Further, the network 100 may include all, or a portion of a public switched telephone network (PSTN), a public or private network, a local area network (LAN), a metropolitan area network (MAN), a wide area network (WAN), a local, regional, or global communication or computer network such as the Internet, a wired or wireless network, an enterprise intranet, other suitable communication link, or any combination of similar systems.

As used here, the term "client" and "client devices", as with client devices 104 and 108, generally refers to any suitable device operable to communicate with the electronic message server 112 through the network 100. Further, client devices 104 and 108 may employ any known operating systems such as MS-DOS®, PC-DOS®, OS-2®, MAC-OS®, or any other appropriate operating systems. Client devices 104 and 108 may include, for example, personal digital assistants, computers (e.g., laptops, desktop workstations, servers, etc.), cellular phones, mobile internet devices (MID), ultra-mobile PCs (UMPC), or any other devices or combination of devices operable to communicate with electronic message server 112 through the network 100.

Electronic message server 112 may include, for example, a file server, a domain name server, a proxy server, a web server, a computer workstation, or any other device operable to route email 102 from a sender to a recipient. Electronic message server 112 may use any appropriate operating system, such as MS-DOS®, MAC-OS®, WINDOWS®, UNIX®, or any other operating system currently in existence or developed in the future. According to a particular embodiment, electronic message server 112 may include a mail and/or calendaring server such as Microsoft Exchange Server developed by Microsoft or another electronic message server 112 such as Ubuntu, OX App Suite, Zimbra, Google Apps for business, or Kerio Connect. Accordingly, the electronic message server may use one or more protocols selected from MAPI, POP3, IMAP, SMTP, EAS, or any other suitable protocol for the delivery of electronic messages. According to a particular embodiment, electronic message server 112 may be associated with an enterprise that employees one or both of first and second users 106, 110.

Although depicted separately from electronic message server 112, risk server 114 may be a part of electronic message server 112, according to certain embodiments. Alternatively, in certain embodiments, a plug-in 116 may be used to provide the additional functionality or risk server 114. Plug-in 116, which may also be referred to as an add-in, addin, add-on, addon, or extension, is a software component that adds a specific feature or features to an existing computer program. Thus, in a particular embodiment, electronic message server 112 may support plug-ins that provide customization to the typical functions performed by electronic message server 112.

According to a particular embodiment, for example, plug-in 116 may enable electronic mail server 112 to communicate with risk server 114 for the secure delivery of electronic messages 102. Risk server 114 may include, for example, a file server, a domain name server, a proxy server, a web server, a computer workstation, or any other device operable to intelligently perform context-based risk assessment of electronic messages based on configured security policies. Risk server 114 may use any appropriate operating system, such as MS-DOS®, MAC-OS®, WINDOWS®, UNIX®, or any other operating system currently in existence or developed in the future. According to a particular embodiment, risk server 114 may be associated with an enterprise that employees one or both of first and second users 106, 110 and operate to enforce enterprise security policies.

For example, in a particular embodiment, second user 110 may use second client device 108 to compose electronic message 102 for delivery to first user 106. The electronic message may be addressed to an email address associated with first user 106 and may be communicated via network 100 to electronic message server 112. In a particular embodiment, electronic message server 112 may communicate the electronic message to risk server 114 for risk analysis of the electronic message. As will be described in more detail below, risk server 114 may determine whether content within the electronic message includes sensitive content that presents some risk to the enterprise or enterprise users. For example, as will be described in more detail below, risk server 114 may parse electronic message 102 and determine that certain keywords that indicate some level of risk are within the electronic message. Alternatively, risk server 114 may determine that a header of the electronic message includes an indicator that identifies the electronic message as including sensitive content. It is recognized, however, that any of the operations described as being performed by electronic message server 112 may be performed by risk server 114 and vice versa. For example, in a particular embodiment, electronic message server 112 may parse electronic message 102 and determine the presence of keywords. Electronic message server 112 may then send the electronic message 102 or the identified keywords to risk server 114 for analysis. Likewise, electronic message server 112 may perform the step of identifying whether the header of the electronic message 102 includes an indicator identifying that the electronic message 102 includes sensitive content. Either or both of electronic message server 112 and risk server 114 may then identify the particular sensitive content in the electronic message 102 and perform the risk analysis.

When the electronic message 102 is determined to include sensitive content, risk server 114 may perform additional functions to ensure the secure transmission of electronic message 102. According to certain embodiments, for example, risk server 114 may request at least one device attribute from the client device 104 associated with first user 106. The device attribute may be requested prior to the transmission of electronic message 102 to client device 104. According to certain embodiments, the device attribute may include an environmental factor associated with a use of the client device. Additionally or alternatively, the device attribute may include an operational factor associated with the environment of the client device. In particular embodiments, for example, the at least device one attribute may include a current geographical location of the client device 104, a network identifier on which the client device 104 is currently operating, a type identifier that indicates whether the client device 104 is a mobile computing device such as a cellphone or tablet, and/or an enterprise identifier that indicates whether the client device 104 is registered for use with an enterprise network. Based on the at least one device attribute, risk server 114 may determine whether first client device 104 is operating outside of an approved geographical area or at an unapproved geographical location. Additionally or alternatively, risk server 114 may determine whether first client device 104 is operating on known or unknown, approved or unapproved, and/or public or private network. For example, risk server 114 may determine that first client device 104 is operating on a network other than enterprise network and determine a level of risk associated with the electronic message 102.

According to certain embodiments, when the level of risk associated with the electronic message exceeds a predetermined level of risk, risk server 114 and/or electronic message server 112 may perform additional security measures. For example, risk server 114 may mask, blur, or otherwise obscure the sensitive content within the electronic message 102 prior to returning the electronic message 102 to electronic message server 112 for delivery to first client device 104. In a particular embodiment, for example, the masked content may be blurred such that it is unreadable by first user 106 when first user 106 views electronic message 102 on client device 104. In another example embodiment, the masked content may be removed and replaced with a meaningless character string. In still another example embodiment, the sensitive content within electronic message 102 may be removed and replaced with one or more symbols or characters that electronic message server 112 assigns to the sensitive content. Electronic message server 112 may then be able to identify and provide the sensitive content to first user 106 at a later time.

According to certain embodiments, the sensitive content may be unmasked when first client device 104 becomes more secure or when first user 106 and/or first client device 104 is authenticated by the enterprise. For example, if first client device 104 was operating on an unknown or public network but then switches operation to a secure private network such as an enterprise network, the sensitive content within electronic message 102 may be unmasked. In a particular embodiment, the unmasking of the sensitive content may occur automatically when the operating environment of first client device 104 changes and become more favorable. In another embodiment, the unmasking of the sensitive content may occur when first user 106 requests that the sensitive content be displayed and electronic message server 112 and/or risk server 114 determine that the level of risk associated with the current operating environment is less than a threshold amount.

Additionally or alternatively, the sensitive content may be unmasked in response to a user request and re-authentication of first user 106. For example, first user 106 may receive the electronic message 102 including masked content on an unsecure client device 104. Because only the sensitive content of the electronic message has been masked, first user 106 may determine the context of the email and be able to respond to the sender in an appropriate manner. If first user 106 desires to see the masked content, first user 106 may request that the masked content within electronic message 102 be provided to client device 104. Prior to unmasking the content, electronic message server 112 may authenticate or re-authenticate first user 106 and/or first client device 104 by requesting enterprise-issued credentials from first user 106. For example, in certain embodiments, electronic message server 112 may request a client identifier and/or a user identifier from first user 106. Upon receiving the device identifier and/or a user identifier from the client device 104 and first user 106, electronic message server 112 or an authentication server (not depicted) may compare the credentials against identification information maintained by the enterprise. Where the client device identifier and the user identifier match the data stored by the enterprise, the sensitive content within electronic message 102 may be unmasked. Conversely, where the identifiers do not match the credentials maintained by the enterprise, the sensitive content within electronic message 102 may remain masked.

FIG. 1 is provided as one example environment in which the techniques described herein for the intelligent, context-based delivery of content may be used. Modifications to the described system and environment may be made. For example, though the risk assessment is described above as being performed by risk server 114, the risk assessment may be performed by electronic message server 112 in other embodiments. For example, in a particular embodiment, plug-in 116 may enable an electronic message server 112 such as Microsoft Exchange Server to perform the risk-assessment functionality described above. In still other embodiments, electronic message server 112 may be a custom packaged electronic message server that is specifically designed to perform risk assessment and policy enforcement while performing traditional email server functions.

Figure 2:
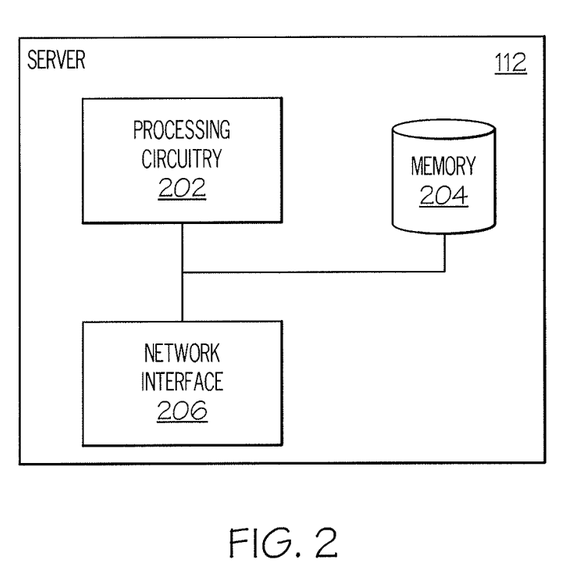
FIG. 2 illustrates electronic message server for intelligent, context-based delivery of sensitive email content to mobile devices, according to a non-limiting embodiment of the present disclosure.

FIG. 2 illustrates an example server 200 for intelligent, context-based delivery of electronic messages according to a non-limiting embodiment. In particular embodiments, server 200 may be an electronic message server such as electronic message server 112 of FIG. 1. Additionally or alternatively, server 200 may be a risk server such as risk server 114 of FIG. 1.

As depicted, server 200 includes a processor 202, memory 204, and a network interface 206. The network interface 206 connects server 200 to the network 100 for intelligent, context-based delivery of electronic messages. The processor 202 may be utilized for processing requirements of server 200. In certain embodiments, processor 202 may be operable to load instructions from a hard disk (not depicted) into memory 204 and execute those instructions.

Network interface 206 may refer to any suitable device capable of receiving an input, sending an output from server 200, performing suitable processing of the input or output or both, communicating with other devices, and so on. For example, the network interface 206 may include appropriate modem hardware, network interface card, and similar devices. Further, the software capabilities of the network interface 206 may include protocol conversion and data processing capabilities, to communicate through a LAN, WAN, or other communication system, allowing server 200 to communicate with other devices. Moreover, the network interface 206 may include one or more ports, conversion software, or both.

Processing circuitry 202 may be any suitable device capable of executing instructions and manipulating data to perform operations for server 200. Processing circuitry 202 may include microprocessors, microcomputers, microcontrollers, digital signal processors, central processing units, processing circuitry, state machines, logic circuitries, and/or any devices that manipulate signals based on operational instructions. For example, processing circuitry 202 may be any central processing unit (CPU), such as the Pentium processor, the Intel Centrino processor, and so on.

Further, memory 204 may be any suitable device capable of storing computer-readable data and instructions. For example, memory 204 may include logic in the form of software applications, random access memory (RAM) or read only memory (ROM). Further examples may include mass storage medium (e.g., a magnetic drive, a disk drive, or optical disk), removable storage medium (e.g., a Compact Disk (CD), a Digital Video Disk (DVD), or flash memory), a database and/or network storage (e.g., a server), other computer-readable medium, or a combination of any of the preceding.

Though server 200 is depicted as including only a single network interface 206, processing circuitry 202, and memory 204, in other embodiments, these items may be present in multiple items, or combined items, as known in the art.

Figure 3:
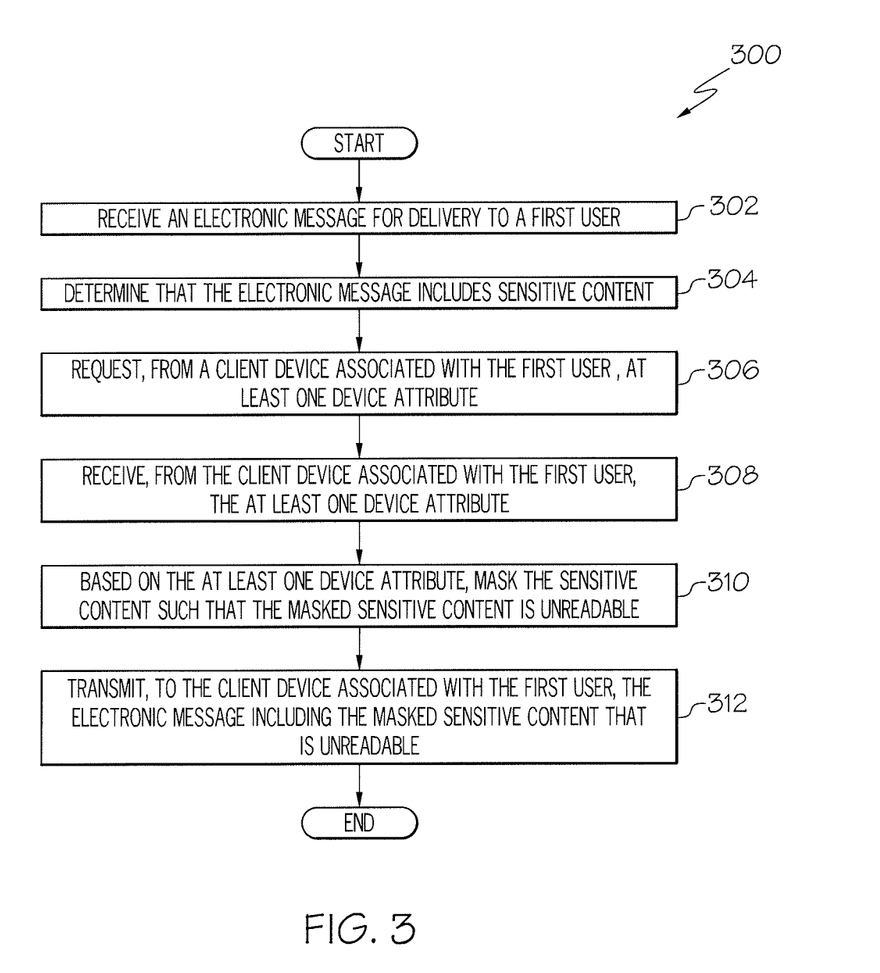
FIG. 3 illustrates a flow diagram depicting a process for intelligent, context-based delivery of sensitive email content to mobile devices, according to a non-limiting embodiment of the present disclosure.

FIG. 3 illustrates a flow diagram for the intelligent, context-based delivery of electronic messages by an electronic message server 112, according to a non-limiting embodiment of the present disclosure. As depicted, the method begins at step 302 when electronic message server 112 receives an electronic message 102 for delivery to a first user 106. According to certain embodiments, the electronic message 102 may be received from a second user 110 of second client device 108. In a particular embodiment, electronic message 102 is an email message and is addressed to an email address associated with the first user 106. In other embodiments, electronic message 102 may include a text message such as an SMS message, an instant message, a voice message, or any other message exchangeable between two or more users.

At step 304, server 112 determines that electronic message 102 includes sensitive content. According to a particular embodiment, for example, electronic message server 112 may identify an indicator in a header of electronic message 102 that indicates that the message includes sensitive content. The indicator may be a flag or other indicator that the sender of electronic message 102 associates to the electronic message.

In another embodiment, server 112 may parse the contents of electronic message 102 and search for keywords within the parsed contents. Server 112 may recognize the keywords as indicative of sensitive content. One example of such keywords could include the phrase "social security number." As another example, a keyword may be "credit card number." As still another example, a keyword might include any sixteen digit numerical string as that also might be recognized as a typical credit card number. In a particular embodiments, the keywords may be predefined based on an administrative or user settings. Additionally or alternatively, the keywords may be automatically learned by electronic message server 112 based on previous electronic message transmissions.

At step 306 and prior to delivering electronic message 102 to the intended recipient, electronic message server 112 may request at least one device attribute from the client device 104 associated with the recipient of electronic message 102. Electronic message server 112 receives the at least one device attribute from client device 104 at step 308.

According to certain embodiments, the device attribute may include an environmental factor associated with the user of the client device 104. Additionally or alternatively, the device attribute may include an operational factor associated with an environment of the client device 104. In a particular embodiment, for example, the device attribute may include whether the client device 104 is operating inside or outside an approved geographical area or at an unapproved geographical location. As another example, the device attribute may identify whether the client device 104 is operating on a known or unknown, approved or unapproved, or private or public network. In a particular embodiment, the device attribute may identify whether the client device 104 is operating on the enterprise network. In still other embodiments, the device attribute may additionally or alternatively indicate whether the client device 104 is a mobile computing device such as a cellular phone or a tablet. Additionally or alternatively, the device attribute may indicate whether the client device 104 is registered for use with or otherwise known to the enterprise or enterprise network. In another example, the device attribute may indicate whether the client device 104 has been reported as lost or stolen.

At step 310, enterprise server 112 may mask the sensitive content within electronic message 102 based on the at least one device attribute received from client device 104. According to certain embodiments, for example, enterprise server 112 may determine a level of risk associated with the sensitive content within electronic message 102 based on the at least one device attribute. For example, if the device attribute indicates that client device 104 is operating on an unknown network and/or outside an approved geographical area, electronic message server 112 assign a level of risk to the electronic message 102. If the level of risk exceeds a maximum threshold, electronic message server may mask the sensitive content so that the sensitive content is unreadable within the electronic message 102.

According to various particular embodiments, masking the sensitive content may include blurring the sensitive content, replacing the sensitive content with a meaningless character string, or replacing the sensitive content with one or more symbols. In still other embodiments, the sensitive content may be replaced with a character string and/or one or more symbols that are assigned to and associated with the sensitive content.

Figure 4:
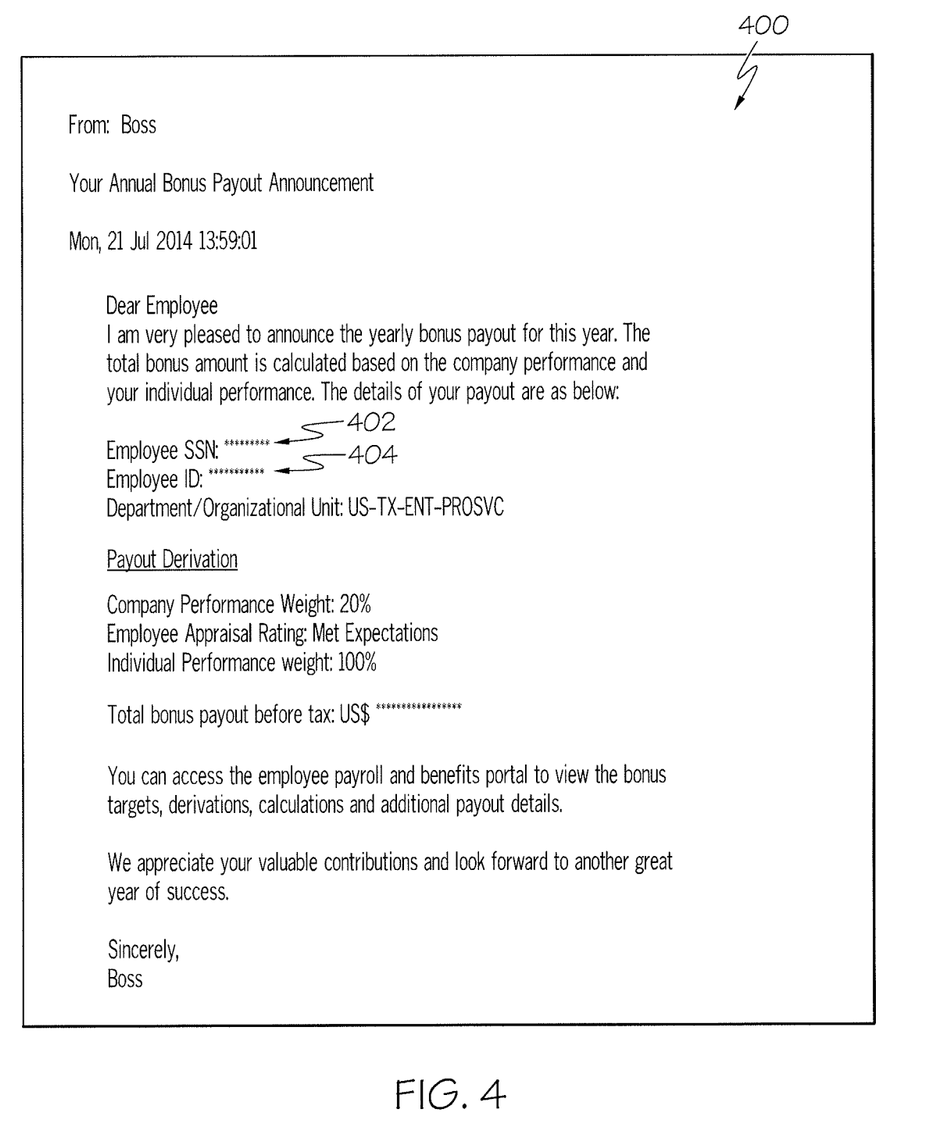
FIG. 4 illustrates an example email including masked content, according to a non-limiting embodiment of the present disclosure.

FIG. 4 illustrates an example electronic message 400 including masked content, according to a non-limiting embodiment of the present disclosure. As depicted, the electronic message 400 included information associated with the employee's Social Security Number (SSN) 402 and the employee's Identification (ID) number. The electronic message 400 also includes a financial amount associated with the employee's total bonus payout before tax 406. As depicted, electronic message server 112 has determined that each type of information includes sensitive content. Prior to transmission of the electronic message 400, electronic message server 112 has replaced the sensitive content with asterisk symbols. In other embodiments, the sensitive content could be only partially replaced. For example, only the first five digits in the social security number may be masked, leaving the last four digits so that the intended recipient is able to verify that the information correctly pertains to the user.

Returning to FIG. 3, at step 312, the electronic message 102 including the masked sensitive content is transmitted to client device 104 associated with the intended recipient. Thereafter, first user 106 of client device 104 may request that electronic message server 112 unmask the sensitive content. As described above, electronic message server 112 may perform an additional risk assessment to determine if the operating environment of client device 104 has become secure or otherwise approved. Additionally or alternatively, electronic message server 112 may initiate an authentication procedure to authenticate or re-authenticate at least one of the client device 104 and the first user of the client device.

Figure 5:
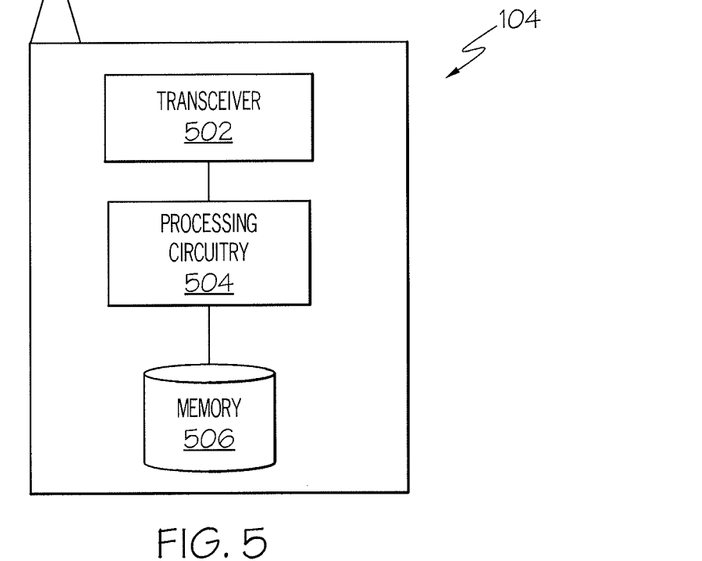
FIG. 5 illustrates a client device for receiving masked email content, according to a non-limiting embodiment of the present disclosure.

FIG. 5 illustrates an example client device 104 for receiving masked email content, according to a non-limiting embodiment of the present disclosure. As depicted, client device 104 includes a transceiver 502, processing circuitry 504, and memory 506. Transceiver 502 enables client device 104 to communicate with electronic message server 112 via network 100 for receipt of electronic messages 102 that include masked sensitive content. Processing circuitry 504 may be utilized for processing requirements of client device 104.

Processing circuitry 504 may be any suitable device capable of executing instructions and manipulating data to perform operations for client device 104. Processing circuitry 504 may include microprocessors, microcomputers, microcontrollers, digital signal processors, central processing units, processing circuitry, state machines, logic circuitries, and/or any devices that manipulate signals based on operational instructions. For example, processing circuitry 504 may be any central processing unit (CPU), such as the Pentium processor, the Intel Centrino processor, and so on.

Further, memory 506 may be any suitable device capable of storing computer-readable data and instructions. For example, memory 506 may include logic in the form of software applications, random access memory (RAM) or read only memory (ROM). Further examples may include mass storage medium (e.g., a magnetic drive, a disk drive, or optical disk), removable storage medium (e.g., a Compact Disk (CD), a Digital Video Disk (DVD), or flash memory), a database and/or network storage (e.g., a server), other computer-readable medium, or a combination of any of the preceding. In certain embodiments, processing circuitry 504 may be operable to load instructions from a hard disk (not depicted) into memory 506 and execute those instructions.

Though client device 104 is depicted as including only a transceiver 502, processing circuitry 504, and memory 506, in other embodiments, these items may be present in multiple items, or combined items, as known in the art.

Figure 6:
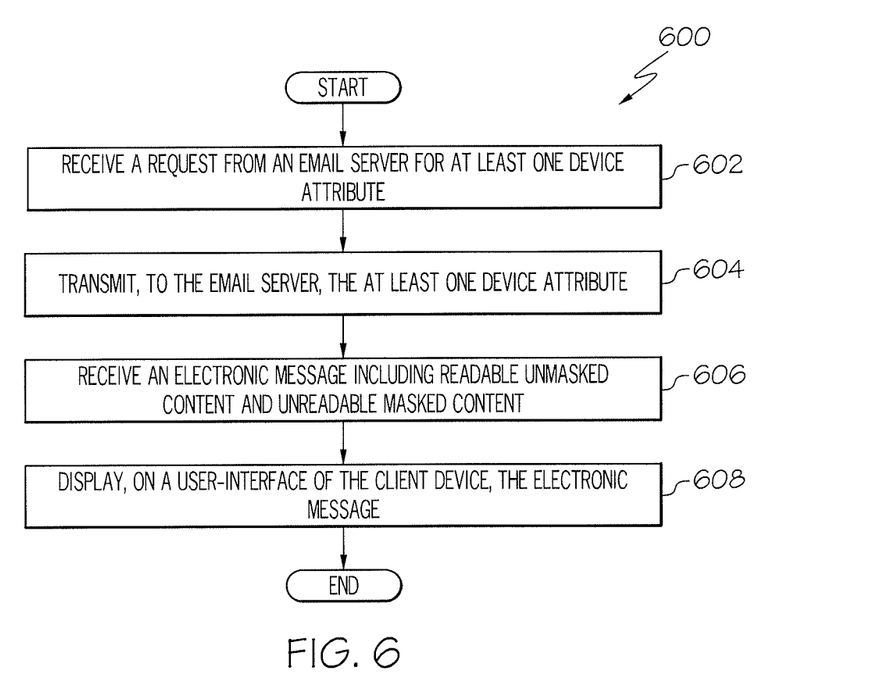
FIG. 6 illustrates a flow diagram depicting a process for receiving masked email content, according to a non-limiting embodiment of the present disclosure.

FIG. 6 illustrates a flow diagram for receiving, by a client device 104 masked email content, according to a non-limiting embodiment of the present disclosure. As depicted, the method begins at step 602 when client device 104 receives a request from an electronic message server 112 for at least one device attribute. At step 604, client device 104 responds by transmitting the at least one device attribute to electronic message server 112.

According to certain embodiments, the device attribute may include an environmental factor associated with the user of the client device 104. Additionally or alternatively, the device attribute may include an operational factor associated with an environment of the client device 104. In a particular embodiment, for example, the device attribute may include whether the client device 104 is operating inside or outside an approved geographical area or at an unapproved geographical location. As another example, the device attribute may identify whether the client device 104 is operating on a known or unknown, approved or unapproved, or private or public network. In a particular embodiment, the device attribute may identify whether the client device 104 is operating on the enterprise network. In still other embodiments, the device attribute may additionally or alternatively indicate whether the client device 104 is a mobile computing device such as a cellular phone or a tablet. Additionally or alternatively, the device attribute may indicate whether client device 104 is registered for use with or otherwise known to the enterprise or enterprise network. In another example, the device attribute may indicate whether the client device 104 has been reported as lost or stolen.

At step 606, client device 104 receives an electronic message 102. According to a particular embodiment, electronic message 102 is an email message and is addressed to an email address associated with the first user 106 of client device 104. In other embodiments, electronic message 102 may include a text message such as an SMS message, an instant message, a voice message, or any other message receivable by client device 104. According to certain embodiments, electronic message 102 includes unmasked content and masked content.

At step 608, the electronic message 102 is displayed on a user-interface of the client device 104. While the unmasked content may be viewed normally by user 106 of client device 104, the masked content includes sensitive content that is unreadable. For example, and as described in more detail above, the masked content may include sensitive content that has been replaced with blurred content, a meaningless character string, or one or more symbols. Because the unmasked content is readable by client device 104, the recipient of electronic message 102 may be able to decipher the general message and context of the electronic message even though the sensitive content is masked and unreadable. If the recipient desires to see the electronic message in its entirety including the masked content, the user 106 of client device 104 may send a request to electronic message server 112 to unmask the sensitive content. As described above, if the operating environment of client device 104 has become secure or otherwise improved, electronic message server 112 may unmask the content for display on client device 104. Additionally or alternatively, electronic message server 112 may initiate an authentication procedure to authenticate or re-authenticate at least one of the client device 104 and the first user of the client device.

The figures illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

While the present disclosure has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. It will also be understood by those of ordinary skill in the art that the scope of the disclosure is not limited to use in a server diagnostic context, but rather that embodiments of the invention may be used in any transaction having a need to monitor information of any type. The specification and the described examples are considered as exemplary only, with the true scope and spirit of the invention indicated by the following claims.

What is claimed is:

1. A method by an electronic message server comprising:
    determining, by the electronic message server, that an electronic message for delivery to a first user comprises sensitive content;
    prior to transmitting the electronic message to a client device associated with the first user, requesting at least one device attribute from the client device associated with the first user, the at least one device attribute comprising a geographic location of the client device;
    receiving, from the client device associated with the user, the at least one device attribute comprising the geographical location of the client device;
    based on the at least one device attribute comprising the geographic location of the client device, determining that the client device is operating either at an unapproved geographical area or outside an approved geographical area;
    based on the at least one attribute, determining a level of risk associated with the sensitive content within the electronic message;
    in response to determining that the client device is either operating at the unapproved geographical area or outside the approved geographical area and in response to the level of risk exceeding a maximum threshold, masking, by the electronic message server, the sensitive content such that the masked sensitive content is unreadable within the electronic message; and
    transmitting, to the client device associated with the first user, the electronic message comprising the masked sensitive content that is unreadable within the electronic message.

2. The method of claim 1, wherein determining that the electronic messages comprises sensitive content comprises:
    identifying, by the electronic message server, that an indicator in a header of the electronic message indicates that the electronic message includes the sensitive content.

3. The method of claim 1, wherein determining that the electronic message comprises the sensitive content comprises:
    parsing, by the electronic message server, the electronic message for one or more keywords; and
    identifying at least one keyword that indicates the sensitive content.

4. The method of claim 1, wherein the at least one device attribute is selected from the group consisting of:
    an environmental factor associated with a use of the client device; and
    an operational factor associated with an environment of the client device.

5. The method of claim 1, wherein the at least one device attribute further indicates at least one of:
    the client device is operating on an unknown network that is not associated with an enterprise network;
    the client device is operating on a public network that is not associated with the enterprise network;
    the client device comprises a mobile computing device;
    the client device is unknown to the enterprise network;
    the client device is not registered for use with an enterprise network; and
    the client device has been reported lost or stolen.

6. The method of claim 1, further comprising:
    receiving, from the client device, a request to unmask the sensitive content; and
    initiating an authentication procedure to authenticate at least one of the client device and the first user of the client device.

7. The method of claim 1, wherein masking the sensitive content such that the sensitive content is unreadable within the electronic message comprises at least one step from the group consisting of:
    blurring the sensitive content;
    replacing the sensitive content with a meaningless character string; and
    replacing the sensitive content with one or more symbols.

8. A method by a client device comprising:
receiving, by the client, a request from an electronic message server for at least one device attribute;
transmitting, to the electronic message server, the at least one device attribute, the at least one device attribute comprising a geographic location of the client device for determining by the electronic message server whether the client device is operating at an unapproved geographical area or outside an approved geographic location and for determining a level of risk associated with sensitive content within an electronic message;
after transmitting the at least one device attribute comprising the geographic location of the client device, receiving the electronic message comprising unmasked content and masked content, the masked content comprising sensitive content that is unreadable within the electronic message based on the at least one device attribute transmitted to the electronic message server and the level of risk associated with the sensitive content within the electronic message; and
displaying, on a user-interface of the client device, the electronic message comprising:
the unmasked content that is readable within the electronic message; and
the masked content that is unreadable within the electronic message.

9. The method of claim 8, wherein the at least one device attribute is selected from the group consisting of:
an environmental factor associated with a use of the client device; and
an operational factor associated with an environment of the client device.

10. The method of claim 8, wherein the at least one device attribute further indicates at least one of:
the client device is operating on an unknown network that is not associated with an enterprise network;
the client device is operating on a public network that is not associated with the enterprise network;
the client device comprises a mobile computing device;
the client device is unknown to the enterprise network;
the client device is not registered for use with an enterprise network; and
the client device has been reported lost or stolen.

11. The method of claim 8, further comprising:
transmitting, to the email server, a request to unmask the sensitive content; and
in response to the request to unmask the sensitive content, receiving an authentication request; and
transmitting authentication information associated with at least one of the client device and the first user of the client device.

12. The method of claim 8, wherein the masked sensitive content is masked using a process selected from the group consisting of:
blurring the sensitive content;
replacing the sensitive content with a meaningless character string; and
replacing the sensitive content with one or more symbols.

13. An electronic message server comprising:
a memory storing instructions; and
processing circuitry configured to execute the instructions to cause the processing circuitry to:
determine that an electronic message for delivery to a first user comprises sensitive content;
prior to transmitting the electronic message to a client device associated with the first user, request at least one device attribute from the client device associated with the first user, the at least one device attribute comprising a geographic location of the client device;
receive, from the client device associated with the user, the at least one device attribute comprising the geographic location of the client device;
based on the at least one device attribute comprising the geographic location of the client device, determine that the client device is operating either at an unapproved geographical area or outside an approved geographical area;
based on the at least one attribute, determine a level of risk associated with the sensitive content within the electronic message;
in response to determining that the client device is either operating at the unapproved geographical area or outside the approved geographical area and in response to the level of risk exceeding a maximum threshold, mask the sensitive content such that the masked sensitive content is unreadable within the electronic message; and
transmit, to the client device associated with the first user, the electronic message comprising the masked sensitive content that is unreadable within the electronic message.

14. The electronic message server of claim 13, wherein determining that the electronic messages comprises sensitive content comprises:
identifying that an indicator in a header of the electronic message indicates that the electronic message includes the sensitive content.

15. The electronic message server of claim 13, wherein determining that the electronic message comprises the sensitive content comprises:
parsing the electronic message for one or more keywords; and
identifying at least one keyword that indicates the sensitive content.

16. The electronic message server of claim 13, wherein the at least one device attribute further indicates at least one of:
the client device is operating on an unknown network that is not associated with an enterprise network;
the client device is operating on a public network that is not associated with the enterprise network;
the client device comprises a mobile computing device;
the client device is unknown to the enterprise network;
the client device is not registered for use with an enterprise network; and
the client device has been reported lost or stolen.

17. The electronic message server of claim 13, wherein the processing circuitry is further configured to execute the instructions to cause the processing circuitry to:
receive, from the client device, a request to unmask the sensitive content; and
initiate an authentication procedure to authenticate at least one of the client device and the first user of the electronic device.

18. The electronic message server of claim 13, wherein when masking the sensitive content such that the sensitive content is unreadable, the processing circuitry is further configured to execute the instructions to cause the processing circuitry to perform a step from the group consisting of:
blurring the sensitive content;
replacing the sensitive content with a meaningless character string; and
replacing the sensitive content with one or more symbols.

* * * * *